US 6,560,170 B2

(12) United States Patent
Hirose (10) Patent No.: US 6,560,170 B2
(45) Date of Patent: May 6, 2003

(54) TRACK SEARCH CONTROL APPARATUS, TRACK SEARCH CONTROL METHOD, DATA RECORDING APPARATUS, DATA REPRODUCTION APPARATUS AND DATA RECORDING MEDIUM

(75) Inventor: Hirokazu Hirose, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 46 days.

(21) Appl. No.: 09/944,949

(22) Filed: Aug. 30, 2001

(65) Prior Publication Data

US 2002/0024890 A1 Feb. 28, 2002

(30) Foreign Application Priority Data

Aug. 31, 2000 (JP) ..................................... P2000-264341

(51) Int. Cl.[7] .............................................. G11B 17/22
(52) U.S. Cl. ................ 369/30.04; 369/30.15; 369/32.01; 369/44.28
(58) Field of Search ................ 369/30.04, 30.1, 369/30.14, 30.15, 30.13, 30.11, 32.01, 44.13, 44.26, 44.28, 47.1, 53.11, 53.3, 53.37, 53.2, 53.24; 386/126

(56) References Cited

U.S. PATENT DOCUMENTS 5,214,626 A * 5/1993 Satoh et al.
5,394,386 A * 2/1995 Park et al.
5,583,835 A * 12/1996 Shimosaka
6,359,844 B1 * 3/2002 Frank
6,483,787 B1 * 11/2002 Suguasawa et al.

* cited by examiner

Primary Examiner—Ali Neyzari
(74) Attorney, Agent, or Firm—Ladas & Parry (57) ABSTRACT

When controlling a search for a target track on an optical disk having tracks on which data are recorded, the track-search control apparatus determines whether or not the optical disk is a DVD-RW disk. Then the apparatus calculates the number of tracks between the position of the currently detected track and the position of the target track, and calculates the number of correction tracks with which to correct the calculated number of tracks when the optical disk is determined to be a DVD-RW disk. Further, the apparatus executes the search for the target track based on the calculated corrected number of tracks.

9 Claims, 3 Drawing Sheets

TRACK SEARCH CONTROL APPARATUS, TRACK SEARCH CONTROL METHOD, DATA RECORDING APPARATUS, DATA REPRODUCTION APPARATUS AND DATA RECORDING MEDIUM

BACKGROUND OF THE INVENTION

1. Field of the Invention

This invention relates to a track search control apparatus, track search control method, data recording apparatus, data reproduction apparatus and data recording medium, and more particularly to a track search control apparatus and track search control method of jumping over a plurality of tracks in searching for a target track; a data recording apparatus and data reproduction apparatus that contains the track search control apparatus; and a data recording medium, on which a track search control program for controlling the track search operation is recorded and which is readable by a computer.

2. Description of the Related Art

Generally, in the case of reproducing data from a recording medium such as an optical disk on which data are recorded on tracks, when reproduction of that data is temporarily paused to start reproduction of other data specified by the user, it is necessary to move, within a short period of time, the optical spot from the position of the track where the currently detected data are recorded to the position on the recording medium of the target track, or the track where the other data to be detected are recorded. Moving this optical spot to the target track will hereafter be called a track jump.

Conventionally, when controlling the track jump, the number of tracks (hereafter called the first number of tracks) between the track where the currently detected data are recorded (hereafter called the first track) and the end of the lead-in area on the optical disk, is found based on identification data (for example the address of data corresponding to the first track), which indicates the first track. Then, the number of tracks (hereafter called the second number of tracks) between the track where the other data are recorded (hereafter called the second track) and the end of the lead-in area on the optical disk, is found based on identification data (for example the address of data corresponding to the second track), which indicates the second track. Further, the number of tracks to be jumped was calculated from the difference between the first number of tracks and second number of tracks. Finally, control for jumping tracks to the target track is executed while detecting the number of tracks already jumped according to the change in the light beam for data reproduction that is reflected from each track.

When finding the first number of tracks and second number of tracks, the identification data is used as an aid in searching for the track in question from a table in which the relationship between each track and the number of tracks between each track and the end of the lead-in area are stored beforehand, and based on this, the first number of tracks or second number of tracks, is found.

Conventionally, this table was created by taking the average value of the number of tracks (this is the number of tracks between each track and the end of the lead-in area, and the value may vary due to the position on the optical disk due to unevenness) that was obtained by considering the unevenness of the track pitch, which is the spacing between pairs of adjacent track on the optical disk, or actual track movement due to rotation of the disk, so even though the total number of tracks already jumped during track jumping is accurately calculated, the original number of tracks (number of tracks stored in memory as the table) used for calculating the target number of tracks to jump during that track jump may differ from the actual number. Therefore, it is possible that the optical spot will not accurately reach the second track position. When the second track is near the end on the outer side of the optical disk, there is a possibility that the second track will also be jumped over during the track jump and that the optical spot will move to an area on the outer side of the disk where no data are recorded, and then it becomes impossible to control the optical spot after that.

Moreover, even if the optical spot does not reach the area on the outer side of the optical disk where no data are recorded, there is also the possibility that in the case of an optical disk on which data are recorded in order starting from the inside, the optical spot may reach the area on the inside where no data are recorded, and this will also result in position control being lost.

Conventionally, it was thought that detecting the movement speed of the track (line speed) could be reflected on the total of tracks already jumped, however, since detection of the line speed itself takes a certain amount of time, it was rarely used as an actual method of correction.

On the other hand, for example, in the case of a high-density optical disk, such as a DVD which is currently used as a reproduction-only disk, the lead-out area and lead-in area are rather large, so even when the position reached by the optical spot is a little off, the optical spot does not jump all the way to the unrecorded area, so position control of the optical spot is not lost.

However, in the case of a DVD-RW (DVD-Re-Recordable, a DVD which can be written over several times), which is recently becoming standard, before executing the ending process (finalization process), a temporary lead-our area and lead-in area are formed and recorded. Since these areas are very narrow, in the case of a DVD-RW disk, there is the problem that the danger of losing position control due to the optical spot jumping to the aforementioned unrecorded area increases.

In addition, the aforementioned track jump control method is executed the same for each optical disk, so when designing a player for a DVD-RW disk, there exists a problem of decreased design freedom.

SUMMARY OF THE INVENTION

In consideration of the above problems, it is the objective of the present invention to provide a track search control apparatus and track search control method that are suitable for all kinds of optical disks and that are capable of preventing the loss of position control as well as are capable of accurately finding the target track of the track jump, and reproducing or recording data; and to provide a data recording apparatus and data reproduction apparatus, which includes the track search control apparatus, and a data recording medium, on which a track search control program for controlling the track search operation is recorded and which is readable by a computer.

The above object of the present invention can be achieved by a track-search control apparatus that controls the search for a target track on a recording medium having tracks on which data are recorded. The apparatus is provided with: a judgment device for determining whether said recoding medium is a specific type of recording medium having a recorded area including said tracks on which data are already recorded, and an adjacent non-recorded area including said tracks on which data have not yet been recorded; a calculation device for calculating the number of said tracks on said recording medium from the currently detected track position to the position of said target track; a correction device for calculating the number of correction tracks for correcting the number of said tracks when said recording medium is said specific type of recording medium according to the result of said determining; and an execution device for executing the search of said target track based on the number of calculated said correction tracks.

According to the present invention, when the recording medium is a specific type of medium that contains both an unrecorded area and a recorded area, the target track is searched for using a corrected number of tracks that was corrected from the number of tracks corresponding to the target track, so it is possible to prevent the loss of position control due to trouble in servo control caused when the search position reaches inside the unrecorded area, and at the same time, it is possible to execute track search control that corresponds to the type of recording medium.

In one aspect of the present invention, said judgment device comprises a wobble detection device for detecting whether or not said tracks that are formed on said recording medium wobble, and said judgment device determines said recording medium is said specific type of recording medium when said tracks are determined to wobble.

According to this aspect, the track is checked to detect whether or not there is any wobbling, and whether or not it is a specific type of medium, so it is possible to accurately detect the type of recording medium.

In another aspect of the present invention, said judgment device comprises a data-type detection device for detecting type data from said recording medium, which indicates the type of data on said recording medium, and said judgment device determines whether or not said recording medium is said specific type of recording medium based on said detected type data.

According to this aspect, the type of the recording medium is detected based on the detected type data, so it is possible to accurately and easily specify the type of recording medium.

In further aspect of the present invention, said correction device calculates the number of said correction tracks based on the preset tolerance for spacing between adjacent said tracks, and the movement speed of said tracks.

According to this aspect, the corrected number of tracks is calculated based on the tolerance for the track spacing and the track movement speed, so it is possible to calculate a corrected number of tracks that corresponds to the specific recording medium.

In further aspect of the present invention, said recording medium is a disk-shaped medium on which data are recorded starting from the inside toward the outside, and where said recorded area is on the inside of said disk-shaped medium with respect to said non-recorded area, and said correction device calculates the number of correction tracks such that the corrected number of said tracks becomes less than number of said tracks.

According to this aspect, even in the case when the recording medium is a disk-shaped recording medium on which data are recorded started from the inside out, and the recorded area is located on the inside of the disk-shaped recording medium with respect to the unrecorded area, it is possible to effectively prevent the search area from reaching the unrecorded area.

The above object of the present invention can be achieved by a data recording apparatus is provided with: (i) a track-search control apparatus that controls the search for a target track on a recording medium having tracks on which data are recorded, the apparatus provided with: (a) a judgment device for determining whether said recoding medium is a specific type of recording medium having a recorded area including said tracks on which data are already recorded, and an adjacent non-recorded area including said tracks on which data have not yet been recorded; (b) a calculation device for calculating the number of said tracks on said recording medium from the currently detected track position to the position of said target track; (c) a correction device for calculating the number of correction tracks for correcting the number of said tracks when said recording medium is said specific type of recording medium according to the result of said determining; and (d) an execution device for executing the search of said target track based on the number of calculated said correction tracks; (ii) a data detection device that detects said data from detected said target track on which said data are recorded, and (iii) a recording device that records other data on said track based on said detected data.

According to the present invention, it is possible to execute a track search that is accurate and that corresponds to the type of recording medium, and record the necessary data.

The above object of the present invention can be achieved by a data reproducing apparatus is provided with: (i) a track-search control apparatus that controls the search for a target track on a recording medium having tracks on which data are recorded, the apparatus provided with: (a) a judgment device for determining whether said recoding medium is a specific type of recording medium having a recorded area including said tracks on which data are already recorded, and an adjacent non-recorded area including said tracks on which data have not yet been recorded; (b) a calculation device for calculating the number of said tracks on said recording medium from the currently detected track position to the position of said target track; (c) a correction device for calculating the number of correction tracks for correcting the number of said tracks when said recording medium is said specific type of recording medium according to the result of said determining; and (d) an execution device for executing the search of said target track based on the number of calculated said correction tracks; and (ii) a data detection device that detects said data from detected said target track on which said data are recorded.

According to the present invention, it is possible to execute a track search that is accurate and that corresponds to the type of recording medium, and record the necessary data.

The above object of the present invention can be achieved by a track-search control method that controls the search for a target track on a recording medium having tracks on which data are recorded, the method comprising the processes of: determining whether said recoding medium is a specific type of recording medium having a recording area including said tracks on which data are already recorded, and an adjacent non-recorded area including said tracks on which data have not yet been recorded; calculating the number of said tracks on said recording medium from the currently detected track position to the position of said target track; calculating the number of correction tracks for correcting the number of said tracks when said recording medium is said specific type of recording medium according to the result of said the process of determining; and executing the search of said target track based on the number of calculated said correction tracks.

According to this aspect, when the recording medium is a specific kind of medium that contains both an unrecorded area and a recorded area, the target track is searched for using a corrected number of tracks that was corrected from the number of tracks corresponding to the target track, so it is possible to prevent the loss of position control due to the occurrence of trouble in servo control caused when the search position reaches inside the unrecorded area, and at the same time, it is possible to execute track search control that corresponds to the type of recording medium.

The above object of the present invention can be achieved by a data-recording medium on which a track-search control program is recorded which is readable by a computer included in a track-search control apparatus that controls the search for a target track on a recording medium having tracks on which data are recorded, the program causing the computer to function as: a judgment device for determining whether said recoding medium is a specific type of recording medium having a recording area including said tracks on which data are already recorded, and an adjacent non-recorded area including said tracks on which data have not yet been recorded; a calculation device for calculating the number of said tracks on said recording medium from the currently detected track position to the position of said target track; a correction means for calculating the number of correction tracks for correcting the number of said tracks when said recording medium is said specific type of recording medium according to the result of said determining; and an execution means for executing the search of said target track based on the number of calculated said correction tracks.

According to the present invention, when the recording medium is a specific kind of medium that contains both an unrecorded area and a recorded area, the computer functions to execute a search for the target track using a corrected number of tracks that was corrected from the number of tracks corresponding to the target track, so it is possible to prevent the loss of position control due to the occurrence of trouble in servo control caused when the search position reaches inside the unrecorded area, and at the same time, it is possible to execute track search control that corresponds to the type of recording medium.

DESCRIPTION OF THE PREFERRED EMBODIMENTS

Next, the preferred embodiments of the present invention will be explained with reference to FIG. 1 thru FIG. 3.

The preferred embodiment of the invention described below is applied to a data reproduction apparatus for reproducing data that are recorded on either a DVD-RW disk, which is a data-recording medium on which data can be overwritten, or a play-only DVD.

In the case of a recordable DVD, which includes the aforementioned DVD-RW, the tracks on the DVD, which generate a reference clock signal during recording, wobble, and in the case of a play-only DVD, the tracks do not wobble.

Figure 1:
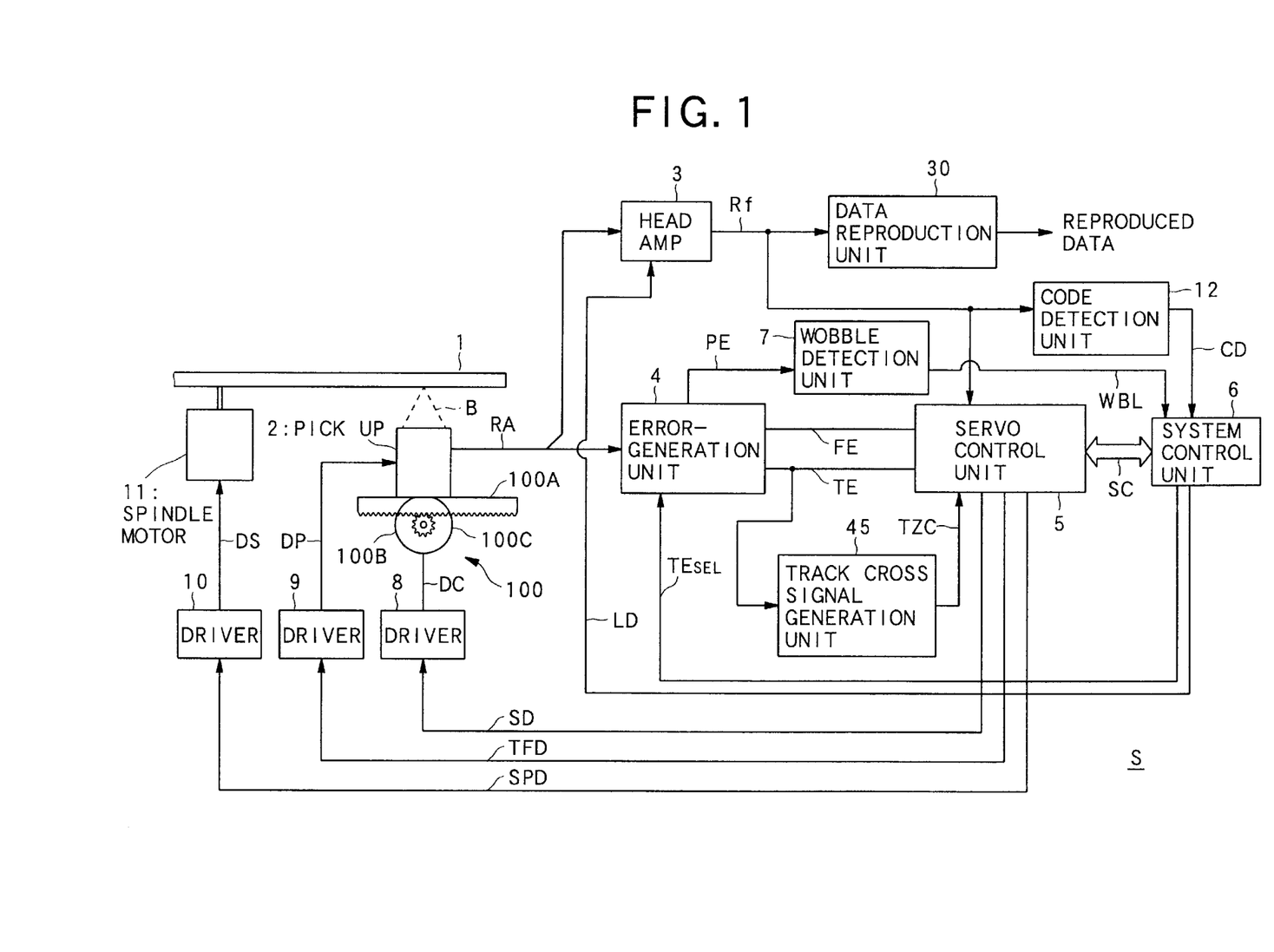
FIG. 1 is a block diagram showing an outline of the data reproduction apparatus of the present invention.
Figure 2:
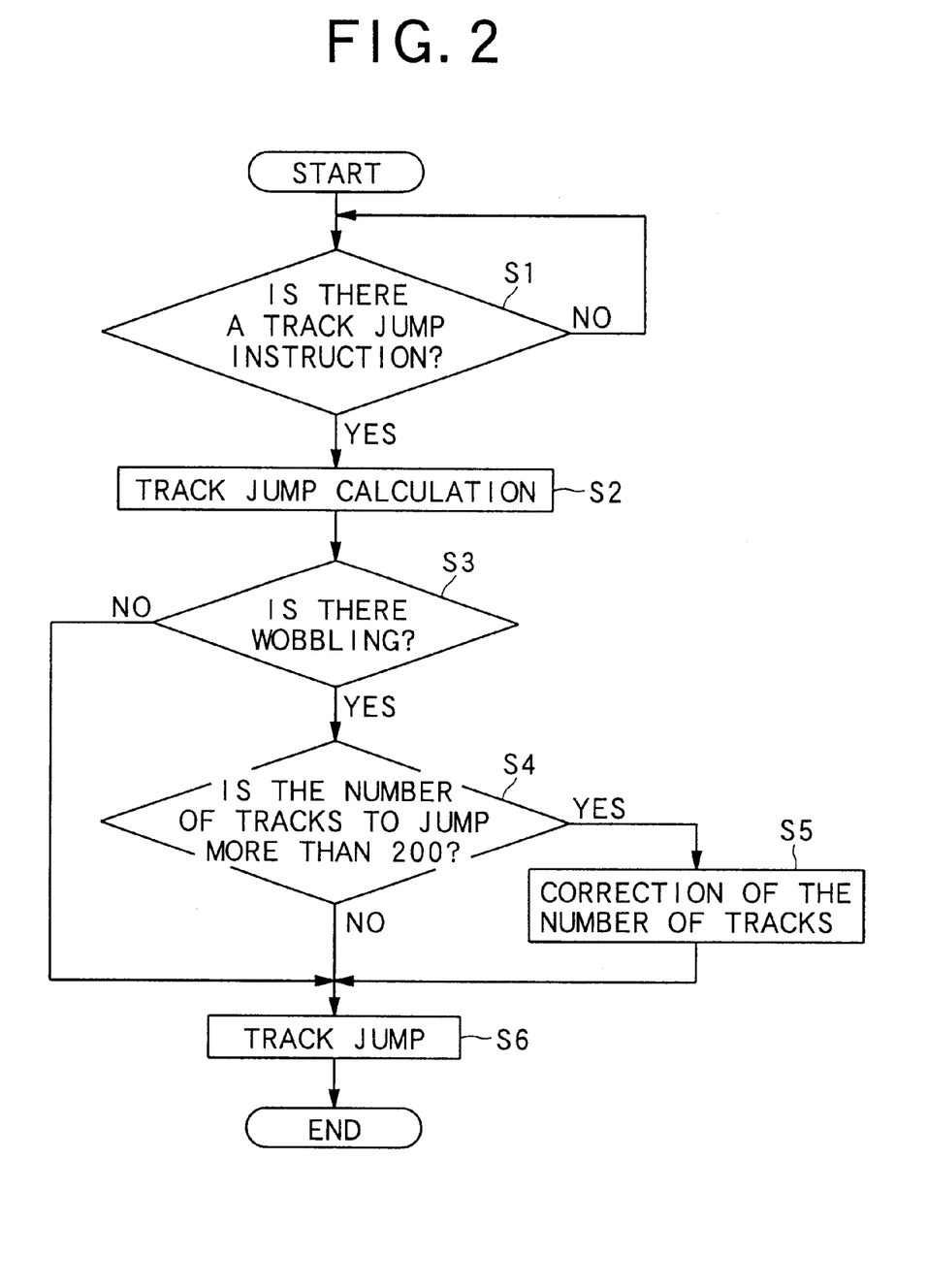
FIG. 2 is a flowchart showing the track search control of the present invention.
Figure 3:
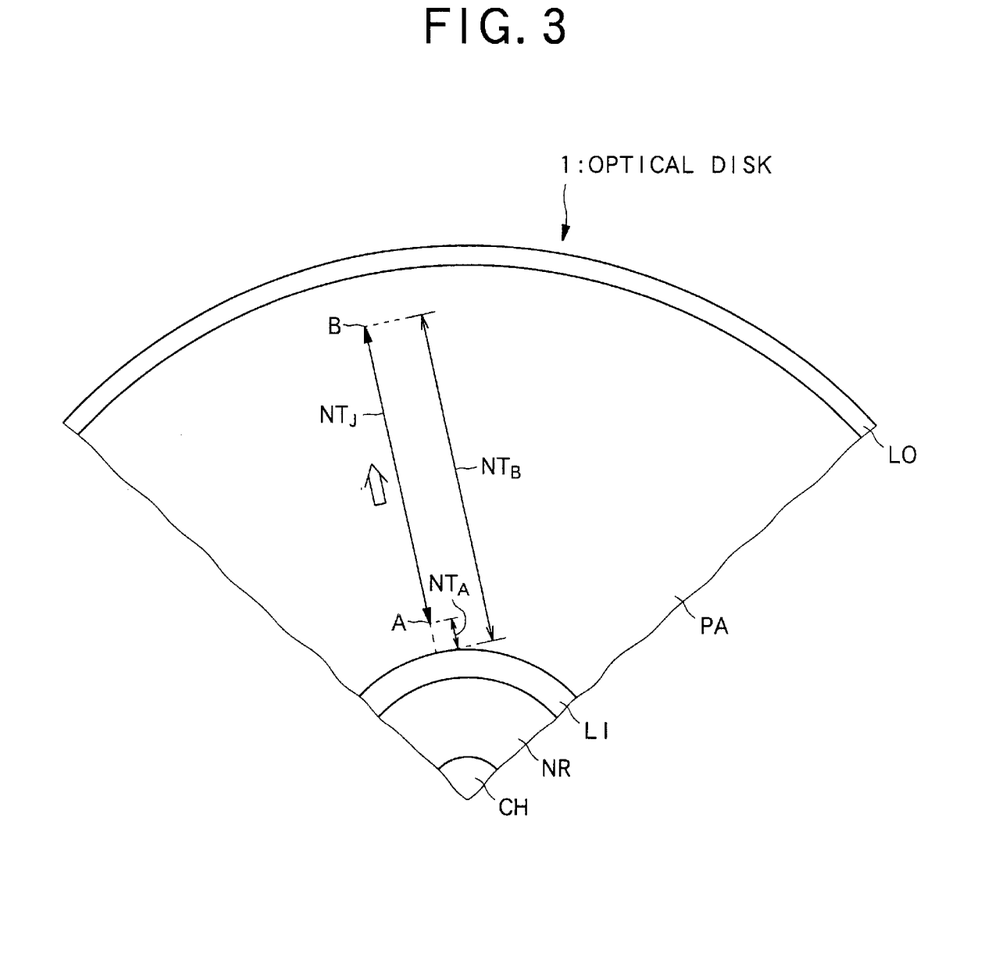
FIG. 3 is a drawing explaining the track search control of the present invention.

FIG. 1 is a block diagram showing the basic construction of the data reproduction apparatus of this embodiment of the invention, FIG. 2 is a flowchart showing the track-search control of the embodiment, and FIG. 3 is a drawing explaining the track-search control of the embodiment.

First, the basic construction and operation of the data reproduction apparatus of this embodiment of the invention will be explained using FIG. 1.

As shown in FIG. 1, the data reproduction apparatus S of the embodiment comprises: a pick-up 2 as a data detection device; a head amp 3; an error-generation unit 4; a servo-control unit as a calculation and execution device; a wobble-detection unit 7 as a wobble detection device; drivers 8 to 10; a spindle motor 11; a code-detection unit 12; a data-reproduction unit 30; a track-cross-signal-generation unit 45; and carriage-servo mechanism 100 that includes a rack 100A and pinion 100C.

The operation will be explained next.

First, the spindle motor 11 rotates the optical disk 1 (DVD-RW or play-only DVD) that is set on the rotating shaft at a preset rpm according to a rotation-drive signal DS from the driver 10.

In order to reproduce data, a pick-up 2 irradiates a light beam B having a fixed intensity onto a track of the rotating optical disk 1 on which the data to be reproduced are recorded, and generates a detection signal RA corresponding to the data based on received light signals that are obtained as received light from the light receiving unit (not shown in the figure), which is divided into two by a dividing line that is parallel to the direction of rotation of the optical disk 1. Further, the pick-up 2 outputs that detection signal RA to the head amp 3 and error-generation unit 4. In addition to the signal corresponding to the data to be reproduced, the detection signal RA also contains a signal corresponding to address data, which corresponds to the track on which the data are recorded in the case when the optical disk 1 is a DVD-RW, that is, address data used when recording the data onto the optical disk 1 (DVD-RW) and which indicates the location where the data are recorded.

The head amp 3 then performs waveform shaping and amplification of the detection signal RA based on a control signal LD from the system-control unit 6 to generate an RF signal Rf that corresponds to that recorded data, and outputs that data to the data-reproduction unit 30. Further, the head amp 3 generates an RF signal Rf that corresponds to the address data, and outputs that signal to the code-detection unit 12 and servo-control unit 5.

The data-reproduction unit 30 performs a preset decoding process for the RF signal Rf, which corresponds to the recorded data, to generate reproduced data that corresponds to the record data, and outputs that data to a display or speaker (not shown in the figure).

The code-detection unit 12 decodes the address data based on RF signal Rf that corresponds to the address data, and outputs that data as a decoded signal CD to the system-control unit 6.

On the other hand, the error-generation unit 4, to which the detection signal RA is input, generates: a focus-error signal FE, which indicates the displacement of the position of the light beam B in the direction perpendicular to the data recording surface of the optical disk 1; a tracking-error signal TE, which indicates the displacement of the position of the light beam B in the direction parallel with the data recording surface of the optical disk 1; and a push-pull-error signal PE, which is the difference between light-receiving units of the pick up 2. Further, the error-generation unit 4 outputs the focus-error signal FE to the servo-control unit 5, the tracking-error signal TE to the servo-control unit 5 and track-cross-signal-generation unit 45, and the push-pull-error signal PE to the wobble-detection unit 7. The push-pull-error signal PE has reciprocally differing waveforms when the optical disk 1 that is mounted on the spindle motor 11 has wobbling tracks, such as in the case of a DVD-RW disk, and when there is no wobbling, such as in the case of a play-only DVD disk.

Moreover, based on the change in the tracking-error signal TE, the track-cross-signal generation unit 45 generates a track-cross signal TZC that changes every time the light spot that is formed on the optical disk 1 by the light beam B crosses a track, and outputs that signal to the servo-control unit 5.

Furthermore, based on the change in the push-pull-error signal PE, the wobble-detection unit 7 detects whether or not there is wobbling of the track on the optical disk 1 that is mounted on the spindle motor 11, then generates a wobble-detection signal WBL that indicates the detection result and output that signal to the system-control unit 6.

Then, based on the focus-error signal FE, tracking-error signal TE, track-cross-signal error TZC and RF signal Rf, the servo-control unit 5 performs overall control of the servo-control operation, including the track-search operation of the embodiment, while exchanging control data SC with the system-control unit 6.

In other words, first, as spindle-servo control and based on the address data, etc. in the RF signal Rf, the servo-control unit 5 generates a rotation-servo signal SPD for rotating the spindle motor 11 at a preset rpm, and outputs that signal to the driver 10.

Then, based on the rotation-servo signal SPD, the driver 10 generates a rotation-drive signal DS for rotating the spindle motor 11, and outputs that signal to the spindle motor 11.

After receiving the signal, the spindle motor 11 rotates the optical disk 1 at the rpm indicated by the rotation-servo signal SPD.

Second, as focus-servo control and based on the focus-error signal FE, the servo-control unit 5 controls the position of the focal point of the light beam B in the vertical direction which is perpendicular to the optical disk 1, and matches the position of the data recording surface on the optical disk 1 with the position of the focal point.

In order to do this, the servo-control unit 5 generates a pick-up-servo signal TFD, which includes a focus-servo signal for controlling the position in the vertical direction of the objective lens (not shown in the figure) in the pick up 2 that focuses the light beam B, and outputs that signal to the driver 9.

Then, based on the pick-up-servo signal TFD, the driver 9 generates a pick-up-drive signal DP for driving an actuator (not shown in the figure) for moving the objective lens in the perpendicular direction, and outputs that signal to the pick up 2.

Third, as tracking-servo control and based on the tracking-error signal TE, the servo-control unit 5 controls the position of the focal point of the light beam B in the horizontal direction which is parallel with the optical disk 1, and matches the position of the data recording surface on the optical disk 1 with the position of the focal point.

In order to do this, the servo-control unit 5 generates a pick-up-servo signal TFD, which includes a tracking-servo signal for controlling the position in the horizontal direction of the objective lens (not shown in the figure) that focuses the light beam B, and outputs that signal to the driver 9.

Then, based on the pick-up-servo signal TFD, the driver 9 generates a pick-up-drive signal DP for driving an actuator (not shown in the figure) for moving the objective lens in the horizontal direction, and outputs that signal to the pick up 2.

Fourth, as carriage-servo control and based on the tracking-error signal TE, the servo-control unit 5 controls the position of the focal point of the light beam B in the horizontal direction which is parallel with the optical disk 1, when the position is outside the range which is controllable by tracking-servo control, and matches the position of the data recording surface on the optical disk 1 with the position of the focal point.

Then, the servo-control unit 5 generates a carriage-servo signal SD for controlling the position of the pick up 2 itself in the horizontal direction, and then outputs it to driver 8.

Then, based on the carriage-servo signal SD, the driver 8 generates a carriage-drive signal DC for driving a carriage motor 100B that rotates a pinion 100C that moves the rack 100A, on which the pick up 2 is mounted, in the radial direction of the optical disk 1, and then outputs that signal to the carriage motor 100B.

The carriage motor 100B then rotates the pinion 100C and moves the rack 100A in the radial direction of the optical disk 1 to executed carriage-servo control.

Finally, in the case of jumping a plurality of tracks in moving the position of the light beam B as track-search control, the servo-control unit 5 generates a carriage-servo signal SD and pick-up-servo signal TFD that correspond to the number of tracks to be jumped, and executes the desired track-search control by moving the position of the light beam B in the radial direction of the optical disk 1 by moving the objective lens in the radial direction, and moving the rack 100A.

The servo-control unit 5 calculates the number of tracks that are jumped during the track-search control based on the track-cross signal TZC.

At the same time that the aforementioned components are operated, the system-control section 6 generates control signals LD and $TE_{SEL}$ for controlling the respective operations based on the wobble-detection signal WBL and decode signal CD, and outputs those signals to the head amp 3 and error-generation unit 4, while as well as performs overall control of the operation of the data-reproduction apparatus S in executing the track-search control of this embodiment, which is described below.

Next, the track-search control of the embodiment will be explained using FIG. 2 and FIG. 3.

As shown in FIG. 2, in the track-search control of the embodiment, first, a control unit (not shown in the figure) determines whether or not an instruction for executing a track jump has been given (step S1).

When an instruction for performing a track jump has not been given (step S1: NO), the control unit waits as is, however, when an instruction for performing a track jump has been given (step S1: YES) the control unit calculates the number of tracks to jump according to track-jump instruction (step S2).

To explain the process of this step S2 in more detail, when jumping tracks from position A to position B on the optical disk 1 as shown in FIG. 3, by referencing a table that is stored in the memory of the system-control unit 6, in which the tracks on the optical disk 1 and the relationship between the tracks and the outer edge of the lead-in area LI are entered in advance, the number of tracks $NT_A$ that are between the track at position A (called track A below) and the outer edge of the lead-in area LI is found based on the address data that indicates track A. The lead-in area LI, as seen from the center of the optical disk 1, is the area formed on the innermost section of the data area on the outside the center hole for affixing the optical disk 1 to the rotating shaft of the spindle motor 11 and the non-recorded area NR where data cannot be recorded.

Then, the number of tracks $NT_B$ that are between the track at position B (called track B below) and the outer edge of the lead-in area LI is found based on the address data that indicates track B. Further, the number of tracks to jump $NT_J$, or in other words, the amount of track movement, is found as the difference between the number of tracks $NT_A$ and number of tracks $NT_B$. The starting point for counting the number of tracks $NT_A$ and $NT_B$ is not limited to the outer edge of the lead-in area, but can be at any position that is preset as the reference point.

After the number of tracks to jump $NT_J$ has been calculated, then, based on the wobble-detection signal WBL, it is determined whether or not the optical disk 1 that is mounted on the spindle motor 1 is a DVD-RW disk having wobbling tracks (step S3).

When it is determined that the tracks on the optical disk 1 do not wobble (step S3: NO), then the optical disk is handled as a play-only DVD that does not have wobbling tracks, and the track search of the embodiment is performed by executing a track jump based on the number of tracks $NT_J$ that were calculated in the conventional way (step S6).

On the other, when it is determined in step S3 that the tracks on the optical disk wobble (step S3: YES), then, it is determined whether or not the number of calculated tracks $NT_J$ is 200 or more, which is the number where the effect of the track-search control of the embodiment begins to be distinguishable (step S4).

When the number of tracks $NT_J$ is less than 200 (step S4: NO), then the effect of the track-search control of this embodiment cannot be obtained, so track jumping is performed in the conventional way, however, when the number of tracks $NT_J$ is 200 or more (step S4: YES), then, in order to prevent the position of the light beam B from jumping further toward the non-recorded area in the data area PA where data are not recorded or outside the lead-out area LO on the outer edge of the data are PA, correction is performed to reduced the value of the number of tracks $NT_J$ (step S5), then track jumping is executed using the number of tracks after correction (step S6) and processing ends.

The extent of correction in step S5 is set from the standpoint of simplification of the calculation process by the system-control unit 6 according to the tolerance that is preset for the spacing between adjacent tracks on the optical disk 1 and the rpm of the optical disk 1, however, more specifically, correction to reduce the original number of tracks $NT_J$ by about 1.5% is suitable.

As explained above, with the operation of the data-reproduction apparatus S performing the track-search control of the embodiment, the number of tracks $NT_J$ is corrected and track jumping is executed when the optical disk 1 that is mounted in the data-reproduction apparatus S is a DVD-RW disk having a narrow lead-out area LO and data area PA, and therefore it is possible to prevent it from becoming impossible to control the position of the light beam due to problems in the servo controls caused when the position of the light beam B (position of the light spot) reaches the non-recorded area or the outside of the lead-out area, as well as it is possible to execute track-search control that is suitable for the type of optical disk 1 used.

Also, by detecting whether or not there is wobbling of the tracks, it is possible to detect whether or not the optical disk 1 is a DWR-RW, and thus it is possible to accurately detect the type of optical disk 1.

Moreover, the number of tracks $NT_J$ is corrected based on the tolerance for track spacing and the number of revolutions of the optical disk 1, so it is possible to calculate the number of tracks to jump for the optical disk 1 used.

Furthermore, when the optical disk 1 is a DVD-RW disk on which data are recorded starting from the inside toward the outside, the number of tracks $NT_J$ is corrected by reducing the number, therefore it is possible to effectively prevent the position of the light beam B from reaching the non-recorded area or outside of the lead-out area LO.

Also, it is possible to accurately execute track-search control that corresponds to the type of optical disk used, and reproduce the necessary data.

The embodiment described above was explained for the case of executing track-search control in the direction toward the outside of the optical disk 1, however, by applying the present invention to the case of executing track-search control in the direction toward the inside of the optical disk 1, it is possible to prevent the position of the light beam B from moving inside of the lead-in area LI.

Also, when determining the type of optical disk 1 that is mounted in the data-reproduction apparatus S, instead of detecting whether or not there is wobbling, it is possible to detect the type based on identification data obtained from the decode signal CD that indicates the type of optical disk 1. In this case, since it is not necessary to detect track wobbling, it is possible to identify the optical disk 1 type accurately and simply.

Furthermore, when the data are recorded on the mounted optical disk 1 starting from the outside toward the inside, and there is a track jump from the lead-in area on the inside of the disk to the outside, it is possible to perform correction in the direction of increasing the number of tracks $NT_J$. By doing so, it is possible to prevent trouble in the servo-control that occurs when the position of the light beam B moves to the non-recorded area between the lead-in area and the area where data have already been recorded.

Moreover, in addition to track-search control for the aforementioned DVD-RW disk, the present invention can also be applied to track-search control for a DVD-R (DVD-Recordable) disk on which data can be recorded only one time.

Furthermore, the present invention can also be applied when detecting position data for recording (address data, etc.) in the case of a data-recording apparatus that records data on a DVD-RW or DVD-R optical disk 1.

Also, by storing a program which corresponds to the flowchart shown in FIG. 2 on a data recording medium, such as a flexible disk or hard disk, and then reading and executing that program by a microcomputer, it is possible to make a general-purpose microcomputer function as the system-control unit 6 and servo-control unit 5 of the embodiment described above.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000–264341 filed on Aug. 31, 2000 including the specification, claims, drawings and summary is incorporated herein by reference in its entirety.

What is claimed is:

1. A track-search control apparatus that controls the search for a target track on a recording medium having tracks on which data are recorded, the apparatus comprising:

a judgment device for determining whether said recoding medium is a specific type of recording medium having a recorded area including said tracks on which data are already recorded, and an adjacent non-recorded area including said tracks on which data have not yet been recorded;

a calculation device for calculating the number of said tracks on said recording medium from the currently detected track position to the position of said target track;

a correction device for calculating the number of correction tracks for correcting the number of said tracks when said recording medium is said specific type of recording medium according to the result of said determining; and an execution device for executing the search of said target track based on the number of calculated said correction tracks.

2. The track-search control apparatus according to claim 1 wherein:

said judgment device comprises a wobble detection device for detecting whether or not said tracks that are formed on said recording medium wobble, and said judgment device determines said recording medium is said specific type of recording medium when said tracks are determined to wobble.

3. The track-search control apparatus according to claim 1 wherein:

said judgment device comprises a data-type detection device for detecting type data from said recording medium, which indicates the type of data on said recording medium, and said judgment device determines whether or not said recording medium is said specific type of recording medium based on said detected type data.

4. The track-search control apparatus according to claim 1, wherein:

said correction device calculates the number of said correction tracks based on the preset tolerance for spacing between adjacent said tracks, and the movement speed of said tracks.

5. The track-search control apparatus according to claim 1, wherein:

said recording medium is a disk-shaped medium on which data are recorded starting from the inside toward the outside, and where said recorded area is on the inside of said disk-shaped medium with respect to said non-recorded area, and said correction device calculates the number of correction tracks such that the corrected number of said tracks becomes less than number of said tracks.

6. A data recording apparatus comprising:

(i) a track-search control apparatus that controls the search for a target track on a recording medium having tracks on which data are recorded, the apparatus comprising: (a) a judgment device for determining whether said recoding medium is a specific type of recording medium having a recorded area including said tracks on which data are already recorded, and an adjacent non-recorded area including said tracks on which data have not yet been recorded; (b) a calculation device for calculating the number of said tracks on said recording medium from the currently detected track position to the position of said target track; (c) a correction device for calculating the number of correction tracks for correcting the number of said tracks when said recording medium is said specific type of recording medium according to the result of said determining; and (d) an execution device for executing the search of said target track based on the number of calculated said correction tracks;

(ii) a data detection device that detects said data from detected said target track on which said data are recorded, and (iii) a recording device that records other data on said track based on said detected data.

7. A data reproducing apparatus comprising:

(i) a track-search control apparatus that controls the search for a target track on a recording medium having tracks on which data are recorded, the apparatus comprising: (a) a judgment device for determining whether said recoding medium is a specific type of recording medium having a recorded area including said tracks on which data are already recorded, and an adjacent non-recorded area including said tracks on which data have not yet been recorded; (b) a calculation device for calculating the number of said tracks on said recording medium from the currently detected track position to the position of said target track; (c) a correction device for calculating the number of correction tracks for correcting the number of said tracks when said recording medium is said specific type of recording medium according to the result of said determining; and (d) an execution device for executing the search of said target track based on the number of calculated said correction tracks; and (ii) a data detection device that detects said data from detected said target track on which said data are recorded.

8. A track-search control method that controls the search for a target track on a recording medium having tracks on which data are recorded, the method comprising the processes of:

determining whether said recoding medium is a specific type of recording medium having a recording area including said tracks on which data are already recorded, and an adjacent non-recorded area including said tracks on which data have not yet been recorded;

calculating the number of said tracks on said recording medium from the currently detected track position to the position of said target track;

calculating the number of correction tracks for correcting the number of said tracks when said recording medium is said specific type of recording medium according to the result of said the process of determining; and executing the search of said target track based on the number of calculated said correction tracks.

9. A data-recording medium on which a track-search control program is recorded which is readable by a computer included in a track-search control apparatus that controls the search for a target track on a recording medium having tracks on which data are recorded, the program causing the computer to function as:

a judgment device for determining whether said recoding medium is a specific type of recording medium having a recording area including said tracks on which data are already recorded, and an adjacent non-recorded area including said tracks on which data have not yet been recorded;

a calculation device for calculating the number of said tracks on said recording medium from the currently detected track position to the position of said target track;

a correction means for calculating the number of correction tracks for correcting the number of said tracks when said recording medium is said specific type of recording medium according to the result of said determining; and an execution means for executing the search of said target track based on the number of calculated said correction tracks.

* * * * *